(12) United States Patent
Wells et al.

(10) Patent No.: US 6,901,387 B2
(45) Date of Patent: May 31, 2005

(54) ELECTRONIC PURCHASING METHOD AND APPARATUS FOR PERFORMING THE SAME

(75) Inventors: Jonathan B. Wells, Park City, UT (US); Hans D. Buehler, Salt Lake City, UT (US)

(73) Assignee: General Electric Capital Financial, Salt Lake City, UT (US)

( * ) Notice: Subject to any disclaimer, the term of this patent is extended or adjusted under 35 U.S.C. 154(b) by 373 days.

(21) Appl. No.: 10/064,151

(22) Filed: Jun. 14, 2002

(65) Prior Publication Data

US 2003/0110136 A1 Jun. 12, 2003

Related U.S. Application Data

(60) Provisional application No. 60/337,910, filed on Dec. 7, 2001.

(51) Int. Cl.[7] .................................................. G06F 17/00
(52) U.S. Cl. .............................. 705/64; 705/35; 705/38; 705/39
(58) Field of Search ............................... 705/64, 44, 51, 705/4, 35, 38, 39, 40, 41

(56) References Cited

U.S. PATENT DOCUMENTS

| | | | |
|---|---|---|---|
| 5,210,687 A | * 5/1993 | Wolfberg et al. | 364/408 |
| 5,621,201 A | 4/1997 | Langhans et al. | |
| 5,631,828 A | * 5/1997 | Hagan | 705/4 |
| 5,724,424 A | 3/1998 | Gifford | |
| 5,798,508 A | 8/1998 | Walker et al. | |
| 5,883,810 A | 3/1999 | Franklin et al. | |
| 5,991,750 A | * 11/1999 | Watson | 705/44 |
| 6,000,832 A | * 12/1999 | Franklin et al. | 364/479.02 |
| 6,006,205 A | 12/1999 | Loeb et al. | |
| 6,029,890 A | 2/2000 | Austin | |
| 6,052,675 A | 4/2000 | Checchio | |
| 6,163,771 A | 12/2000 | Walker et al. | |

(Continued)

FOREIGN PATENT DOCUMENTS

| | | |
|---|---|---|
| EP | 1 029 311 B1 | 6/2001 |
| EP | 1 115 095 A2 | 7/2001 |
| WO | WO 009930294 A1 * | 6/1999 |
| WO | WO 99/49424 | 9/1999 |
| WO | WO 00/49586 | 8/2000 |
| WO | WO 00/62259 | 10/2000 |
| WO | WO 01/29637 A2 | 4/2001 |

OTHER PUBLICATIONS

Pickacard Many and Varied are the Methods That Have Been Devided to Make E–Commerce Safe: Virtual Cards; Singing; and a Cardless Solution; Gilad Nass; Israel Business Arena; Aug. 27, 2001.*

Phillips, Stephen– "Case Study—Orbiscom and Cyota", Sep. 5, 2001, download from http://www.cyota.com/view-CyotaNews.cfm?id=41 on Apr. 24, 2002, ©2001, The Financial Times. 2pgs.

*Primary Examiner*—Pierre E. Elisca
(74) *Attorney, Agent, or Firm*—Buckley, Maschoff & Talwalker LLC

(57) ABSTRACT

A computer-assisted method includes hardware, software and telecommunications components that cooperatively achieve the technical effect of an improved electronic purchasing transaction system. In various embodiments of the invention, at least one master account is established for a client. A pool of limited use account identifiers or secondary account identifiers, that are separate and distinct from the master account, is associated with the master account by a purchasing system or account management system. Each of the limited use account identifiers may be used by the client to purchase items from merchants.

50 Claims, 10 Drawing Sheets

U.S. PATENT DOCUMENTS

| | | |
|---|---|---|
| 6,169,974 B1 | 1/2001 | Baumgartner et al. |
| 6,193,155 B1 | 2/2001 | Walker et al. |
| 6,226,624 B1 | 5/2001 | Watson et al. |
| 6,227,447 B1 | 5/2001 | Campisano |
| 6,324,526 B1 | 11/2001 | D'Agostino |
| 6,330,544 B1 | 12/2001 | Walker et al. |
| 6,339,766 B1 | 1/2002 | Gephart |
| 6,360,209 B1 | 3/2002 | Loeb et al. |
| 6,453,296 B1 | 9/2002 | Iwamura |
| 6,456,984 B1 | 9/2002 | Demoff et al. |
| 6,598,031 B1 | 7/2003 | Ice |
| 2001/0007098 A1 | 7/2001 | Hinrichs et al. |
| 2001/0011222 A1 | 8/2001 | McLauchlin et al. |
| 2001/0029473 A1 | 10/2001 | Yamaoka et al. |
| 2001/0032192 A1 | 10/2001 | Putta et al. |
| 2001/0034702 A1 | 10/2001 | Mockett et al. |
| 2001/0034720 A1 | 10/2001 | Armes |
| 2001/0037312 A1 | 11/2001 | Gray et al. |
| 2001/0042784 A1 | 11/2001 | Fite et al. |
| 2001/0047310 A1 | 11/2001 | Russell |
| 2001/0047330 A1 | 11/2001 | Gephart et al. |
| 2001/0047335 A1 | 11/2001 | Arndt et al. |
| 2001/0047336 A1 | 11/2001 | Maycock, Jr. et al. |
| 2001/0051917 A1 | 12/2001 | Bissonette et al. |
| 2001/0051924 A1 | 12/2001 | Uberti |
| 2002/0007320 A1 | 1/2002 | Hogan et al. |
| 2002/0035548 A1 | 3/2002 | Hogan et al. |
| 2002/0059146 A1 | 5/2002 | Keech |
| 2002/0065774 A1 | 5/2002 | Young et al. |
| 2002/0073045 A1 | 6/2002 | Rubin et al. |
| 2002/0091646 A1 | 7/2002 | Lake et al. |
| 2002/0120587 A1 | 8/2002 | D'Agostino |
| 2002/0133467 A1 | 9/2002 | Hobson et al. |
| 2002/0174030 A1 | 11/2002 | Praisner et al. |
| 2003/0018567 A1 | 1/2003 | Flitcroft et al. |

\* cited by examiner

| CLIENT DATABASE 300 | | | | | | |
|---|---|---|---|---|---|---|
| LIMITED USE ACCOUNT IDENTIFIER USED 302 | MERCHANT/ITEM IDENTIFIER 304 | PURCHASE ORDER IDENTIFIER/ CHARACTER STRING 306 | TRANSACTION AMOUNT 308 | TRANSACTION DATE 310 | EXPIRATION DATE 312 | STATUS OF DELIVERY OF ORDERED ITEM 314 |
| 111-2221-3331-4441 | 2821 | SV21214 | $225.00 | 01/17/02 | 03/01/02 | Received |
| 2221-1124-0987-1118 | 013-22-9087613 | SV21215 | $1.95 | 01/19/02 | 03/01/02 | Received |
| 9870-0198-0090-4567 | ABC Office Supply | SV21216 | $240.00 | 01/31/02 | 03/01/02 | Partial |
| 1984-4619-7624-5684 | N/A | SV21217 | $796.54 | 02/07/02 | 03/01/02 | None |

FIG. 3

ACCOUNT MANAGEMENT SYSTEM DATABASE 400

| MASTER ACCOUNT IDENTIFIER 402 | NUMBER OF LIMITED USE ACCOUNT IDENTIFIERS ASSIGNED 404 | NUMBER OF LIMITED USE ACCOUNT IDENTIFIERS IN USE 406 | NUMBER OF LIMITED USE ACCOUNT IDENTIFIERS WITH PARTIAL SHIPMENTS 410 | PERCENTAGE OF LIMITED USE ACCOUNT IDENTIFIERS AVAILABLE 412 | NEXT AVAILABLE LIMITED USE ACCOUNT IDENTIFIER 414 |
|---|---|---|---|---|---|
| 0001-2002-4850-9999 | 50 | 20 | 3 | 50% | 2221-1124-0987-1118 |
| 0020-2014-3156-4222 | 6 | 1 | 0 | 83% | 1917-1918-0056-9901 |
| 0170-5650-4201-7889 | 132 | 30 | 14 | 34% | 3737-3402-1987-9541 |
| 0376-0420-9988-1555 | 40 | 39 | 0 | 0% | N/A |

FIG. 4

TRANSACTION DATABASE 500

| LIMITED USE ACCOUNT IDENTIFIER 502 | MASTER ACCOUNT IDENTIFIER 504 | PREAUTHORIZED AMOUNT 506 | PAYMENT AMOUNT REQUESTED 508 | MERCHANT/ITEM IDENTIFIER OR CHARACTER STRING SUBMITTED WITH PRE-AUTHORIZATION REQUEST 510 | RECEIVED MERCHANT/ ITEM IDENTIFIER 512 | TRANSACTION AUTHORIZED? 513 | REISSUE LIMITED USE ACCOUNT IDENTIFIER? 514 |
|---|---|---|---|---|---|---|---|
| 2221-1124-0987-1118 | 0001-2002-4850-9999 | $200-$250 | $225.00 | 2821; SV21215 | 2821 | Y | Y |
| 6226-0111-0918-8422 | 0001-2002-4851-0003 | $500 +/- 6% | $502.50 | 1717 | 1717 | Y | N |
| 6721-6700-0149-8200 | 0001-2002-4851-0019 | $175.00 | $176.90 | 2422 | 3017 | N | N |
| 7297-4144-8107-1006 | 0001-2002-4851-0064 | $2000.00 | N/A | 011-49-X1J46 | N/A | N/A | N |

ACCOUNT SUMMARY
Master Account Number 0001-2002-4850-9999

| Date | Limited Use Account Identifier | Character String Received | Purchase Amount | Merchant SIC/ Item SKU |
|---|---|---|---|---|
| 01/17/02 | 1111-2221-3331-4441 | SV21214 | $225.00 | Merchant: 2821 |
| 01/19/02 | 2221-1124-0987-1118 | SV21215 | $1.95 | Item:013-22-90876J3 |
| 01/31/02 | 9870-0198-0090-4567 | SV21216 | $240.00 | Merchant: ABC Office Supply |
| 02/07/02 | 1984-4619-7624-5684 | SV21217 | $796.54 | Item: Misc. Office Supplies |
| 02/15/02 | 1589-7254-2334-5402 | SV21218 | $2000.02 | Merchant: 0143; Item: 000-001-1DZX1-8124 |
| 02/17/02 | 1111-2221-3331-4441 | SV21219 | $15.00 | SV21219 |

FIG. 9

ELECTRONIC PURCHASING METHOD AND APPARATUS FOR PERFORMING THE SAME

CROSS REFERENCE TO RELATED APPLICATIONS

This application claims priority under 35 U.S.C. § 119 to U.S. Provisional Patent Application Ser. No. 60/337,910 entitled "Electronic Purchasing Card" filed on Dec. 7, 2001, the entirety of which is hereby incorporated by reference.

BACKGROUND OF INVENTION

1. Field of the Invention

The present invention relates generally to financial data processing techniques. More particularly, embodiments of the present invention relate to electronic purchasing methods and apparatus.

2. Discussion of the Prior Art

Many cashless purchasing transactions in commerce involve the use of a transaction card, such as a credit or debit card, for providing payment for a product or service to a merchant. As such cards have become more ubiquitous, so also has the infrastructure supporting the use of such cards. What was a simple relationship between a card issuer and a cardholder has evolved to include intermediaries providing authorization services and financial distribution services. The infrastructure has come to facilitate on-line or near real-time transaction authorization in an electronic purchasing environment.

In order to conduct transactions over such a network, businesses typically establish a series of accounts with a card issuer and distribute transaction cards associated with each account to their employees or agents for use in executing cashless transactions. To minimize fraud and abuse in the purchasing of goods and services, several authorization standards have been established. For example, when establishing a credit account, an account issuer or client may place fixed restrictions upon the financial account, such as by transaction amount or merchant type. Restrictions may include account limitations such as, for example, account level amount limits (e.g., an account may have a total credit limit of $5,000). Merchant restrictions may be identified by one or more allowable standard industrial codes (SICs), merchant identifiers (MIDs) or the like.

An account issuer, upon the establishment of an account, may employ a third party authorizing agent to provide authorization services and strictly enforce account limitations as agreed upon between the account issuer and client. The account issuer may inform the authorizing agent of the account of the specific terms under which an individual purchase may be authorized.

Once an account and any desired account restrictions have been established, the account issuer provides the client with information necessary to initiate cashless transactions. Such account information generally includes an account number and expiration date as assigned by the account issuer to the financial account. The predominate form of providing account information to the account user is to provide a physical transaction card generally taking the form of a credit card, debit card, smart card or the like, and, in some instances, bearing an account number. A client or employee thereof may then initiate a transaction with a merchant by physically providing the card at a merchant's point-of-sale terminal and/or by submitting the account number by other known means to cause funds to be provided to the merchant.

In commonplace transaction processing systems, upon receipt of an account number, the merchant initiates an authorization request process to verify that the transaction parameters of the present transaction are within the fixed boundaries or limitations placed upon the account. Existing transaction processing systems utilize account-specific limitations (e.g., such as an account credit limit, etc.). Each authorization request compares the details of the current transaction with the previously established account-specific limitations associated with the account.

Payment authorization requests may electronically pass through a third party agent, such as an acquiring bank as designated by a bank identification number (BIN) of the authorization request, and additionally may route through a network such as those operated by card associations or entities (e.g., MASTERCARD, VISA, DISCOVER and AMERICAN EXPRESS) prior to reaching an authorizing agent for comparison of account parameters. The authorizing agent then compares the transaction parameters for conformance with account limitations. The authorizing agent then may issue an authorization response including an acceptance or denial indicator for the transaction.

Funds generally are not transferred from an issuer bank to a merchant bank when the merchant requests an authorization. Funds typically transfer as a result of a settlement process. A settlement process generally occurs at a periodic time such as evenings or nights when a merchant transmits to an authorizing agent and presents a series of accepted and authorized transactions occurring throughout the previous period and requests financial settlement of such transactions. The merchant initiates a settlement request with the authorizing agent (if used) which generally comprises the account number to be debited, the amount of the debit and other information such as SIC and BIN designators. As part of the settlement process, the authorizing agent issues a settlement request to the account issuer.

After settlement, and typically within some set period of time, the account issuer provides an account summary to the client for notification of payment due or for other record keeping purposes. In such generic authorization processing as described above, billing account information contains relatively little, non-descriptive information typically limited to account number, a transaction amount and, perhaps, limited merchant information, such as the name and location of the merchant.

Further shortcomings of the authorization process as described above are noteworthy. First, a payment authorization performed by the authorizing agent provides a regulation of transactions by either declining transactions originating at a merchant having a prohibited SIC goods/services designator, or withholding authorization from transactions that exceed fixed available account level limits. Such an authorization process approves transactions of values less than the available account level limits transpiring at non-prohibited merchant point of sale terminals having a non-barred SIC goods/services designator.

Existing authorization techniques do not provide a method or system for enforcing strict transaction parameters prior to authorization of restricted transaction types on a transaction-by-transaction basis. Additionally, existing techniques do not permit an account issuer to create varied transaction authorization parameters without re-initiating account establishment procedures.

A second shortcoming of the authorization processing in the existing technologies relates to periodic billing account information sent from the account issuer to the client. As previously described, the account summary information generally includes only an account number and a transaction amount, and may further contain limited merchant information such as the name and geographic location of the merchant. The client is not consistently provided with detailed information pertaining to each specific transaction but rather is presented only with information showing an amount and information identifying the merchant at which the transaction occurred. That is to say, a client generally does not have a tracking mechanism to track the execution of a specific transaction and the billing of such a transaction on an account summary. In prior configurations, the client may only discern that a certain amount of money, e.g., a transaction amount, was exchanged with a specific merchant.

A further shortcoming is that the account number has been exposed to numerous parties not related to the client in performing the transaction over the purchasing network. If the account number is intercepted during the process, unauthorized parties may attempt to fraudulently use the account to purchase items.

A further shortcoming of existing purchasing programs is that each employee authorized to participate in the program is issued a payment card. This, unfortunately, can lead to fraud, abuse, error, or other mistakes. It would be desirable to limit the potential for such mistakes. Further, issuance and management of the distribution of individual cards can be expensive and error-prone. Accordingly, what is needed is an improved payment system that addresses the above-identified problems in certain existing technologies.

SUMMARY OF INVENTION

According to various embodiments of the systems disclosed herein, a computer-assisted method includes hardware, software and telecommunications components that cooperatively achieve the technical effect of an improved electronic purchasing transaction system. In various embodiments of the invention, a client establishes at least one master account with an issuer. A pool of limited use account identifiers or secondary account identifiers, that are separate and distinct from the master account, is associated with the master account by the account issuer. Each of the limited use account identifiers may be used by the client to purchase items from merchants.

To utilize the limited use account identifiers, the client selects an item to purchase from a merchant. The client assigns a purchase order code or other identifying character string to the item or items to be purchased, and further indicates an expected financial amount for the transaction. In some embodiments, an expected time of the transaction is also provided. This transaction data is then transmitted to an intermediary in a pre-authorization request. Upon receipt of the request, the intermediary selects one of the available limited use account identifiers from the pool assigned to the particular client's master account. The selected limited use account a identifier is then provided to the client, who in turn, provides it to the merchant for effecting payment for the purchase.

The merchant, in turn, provides the limited use account identifier and a financial amount due to a payment clearance network, with the transaction being ultimately approved or disapproved by the account issuer or an agent thereof. The authorization for the transaction is dependent upon whether the financial amount, as well as other data received with the limited use account identifier matches the data received with the client's pre-authorization request or is within a predetermined range thereof. In some embodiments, the authorization may depend on an identification of the merchant, the amount of the transaction, and/or the date of the transaction.

If such data match, the transaction may be approved by the account issuer. After authorization of the transaction, the account issuer generates an account summary including the received financial amount and the purchase order number or other identifier received with the request. The account summary may be transmitted to the client for internal reconciliation. Pursuant to some embodiments, limited use account identifiers may be reissued or reused after a transaction using the limited use account identifier has settled or after a preauthorization of the limited use account identifier has expired.

In further embodiments of the disclosed system, the pool of available limited use account identifiers may be assigned prior to any purchase requests by an client, and the number of available limited use account identifiers may be based on the client's purchasing history, or other anticipated amounts of transactions by the client.

BRIEF DESCRIPTION OF DRAWINGS

Further aspects of the instant invention will be more readily appreciated upon review of the detailed description of the preferred embodiments included below when taken in conjunction with the accompanying drawings, of which:

FIG. 3 is an illustration of an exemplary client database stored by the server of FIG. 2A;

FIG. 4 is an illustration of an exemplary transaction database stored by the server of FIG. 2A;

FIG. 5 is an illustration of an exemplary reconciliation database stored by the server of FIG. 2B;

FIG. 9 is an exemplary account summary statement received by a client from an account issuer in accordance with certain embodiments of the present invention.

DETAILED DESCRIPTION

Figure 1:
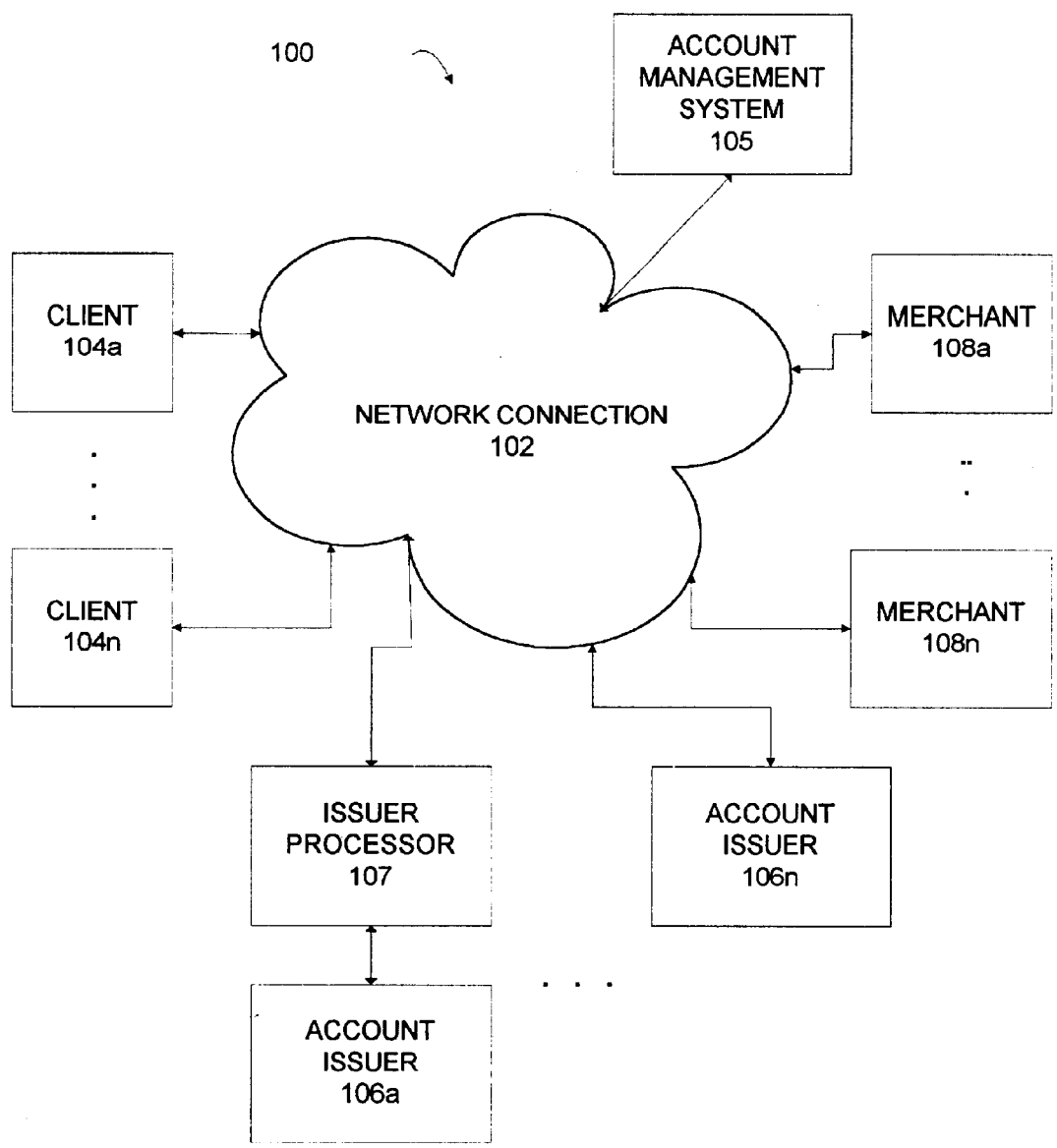
FIG. 1 is a schematic diagram of an exemplary computer network for use with the present invention.

Embodiments of the present invention provide an improved electronic payment processing system, certain embodiments of which are particularly useful for large purchasing entities, such as corporate purchasing departments. For example, such embodiments facilitate quick and accurate reconciliation of purchasing transactions entered into by a corporation by allowing the corporation to provide detailed transaction information in a pre-authorization process. The detailed transaction information may later be submitted to the corporation in an account summary or settlement file. The account summary could be provided in an electronic format suited to the corporation's accounting and reconciliation software, so as to minimize the need for data entry in such systems. For example, the format and data provided in the account summary may include enhanced transaction data and other data formatted to allow the information to be entered directly into the corporation's general ledger.

According to some embodiments of the present invention, the provision of a pool of limited use account identifiers allows for quick assignment of a limited use account identifier to a particular transaction. The limited use account identifiers may be distributed and re-used on an as-needed basis, thereby eliminating the need to provide employees or agents with a physical transaction card. According to some embodiments of the present invention, the association of transaction-level controls with limited use account identifiers takes the purchasing discretion or power from individual employees or agents, thereby reducing the potential for fraud, abuse, errors or other mistakes. Similarly, these controls reduce the potential for merchant fraud, abuse, errors or other mistakes.

To facilitate understanding of various features of embodiments of the present invention, a number of terms are used herein. For example, the terms "client", "corporation" or "purchasing entity", etc. may be used to refer to an entity which is a participant in a purchasing program operated pursuant to embodiments of the present invention. Those skilled in the art will understand that any of a number of different types of entities may benefit from purchasing programs pursuant to embodiments of the present invention.

Several different "accounts" are referred to herein. For example, as used herein, the term "financial account" or "settlement account" refers to a top-level account relationship between a purchasing entity and an account issuer. The term "master account" is used to refer to one or more subsidiary accounts which are used to identify pools of limited use account identifiers. A purchasing entity may have one or more master accounts, each master account associated with a pool of limited use account identifiers. Each master account may be associated with a different purchasing group, organization, or division of the client. For example, a corporation may have two divisions that participate in a purchasing program. Each division may be assigned a separate master account. Each "master account" or pool identifier may be a unique code, character(s) or other information used to specifically identify a particular group or pool of limited use identifiers.

As used herein, the term "limited use account identifier" is used to refer to individual accounts that are associated with a particular master account. Pursuant to some embodiments of the present invention, a plurality (or a "pool") of these limited use account numbers may be associated with each master account. Each of these limited use account identifiers is used by the purchasing entity to purchase goods or services. Pursuant to some embodiments of the present invention, each of the limited use account identifiers may be a payment card account identifier (e.g., such as a 16-digit MasterCard formatted credit account identifier, a 15-digit American Express formatted account identifier, or the like).

Referring now to FIGS. 1–9, wherein similar components of the present invention are referenced in like manner, various embodiments of an improved electronic purchasing method, and apparatus for accomplishing the same, are disclosed.

Turning now to FIG. 1, there is depicted an exemplary computer network 100 over which a plurality of client terminals 104a–n, one or more account management systems 105, one or more account issuer servers 106a–n, one or more issuer processors 107, and one or more merchant terminals 108a–n may communicate over a system of electronic and/or wireless network connections 102. In certain embodiments, the network 100 may include other terminals for third party clearance houses and the like found in certain existing payment processing networks.

Computer network 100 may be any one or more of a local area network (LAN), a wide-area network (WAN), an intranet environment, an extranet environment, a wireless network or any other type of computer network, such as those enabled over public switched telephone networks. Computer network 100 may also involve an Internet-based environment commonly referred to as the World Wide Web.

Each of the devices of FIG. 1 may be in communication via one or more data communication networks 100. For example, in some embodiments, a company operating a purchasing card program pursuant to embodiments of the present invention may be in communication with one or more merchants via the Internet, telephone, or other networks. One or more merchants may be interconnected with one or more financial institutions via a second network, commonly referred to as a payment network (e.g., such as the payment card networks operated by or on behalf of MasterCard International, Inc., or Visa International Service Association). Such payment networks are adapted to receive, forward, and process transactions using credit cards, debit cards, and other payment cards and devices.

In some embodiments, transactions are conducted primarily using the Internet. For example, in some embodiments, communication between client device 104 and account management system 105, between client device 104 and merchant 108, and between account management system 105 and issuer processor 107 all occur over the Internet. As a further example, a merchant receiving a limited use account identifier pursuant to embodiments of the present invention may utilize one or more networks to forward the limited use account number (along with other transaction information) to the financial institution which issued the limited use account number (the "issuing bank") to complete the transaction.

In some embodiments, some or all of the devices are in communication with one or more account management systems 105. Account management system 105 may be a computing system, such as a server, operated by or on behalf of an entity which manages, controls, and administers purchasing programs pursuant to embodiments of the present invention. For example, as will be discussed further below, account management system 105 may function to manage the use and dissemination of limited use account identifiers for different participants in a purchasing program.

Groups or "pools" of limited use account identifiers may be established for each participating entity. Each pool may be identified by a master account identifier which is associated with a particular participating group. According to some embodiments, account management system 105 functions to maintain, update, and disseminate individual limited use account identifiers on behalf of different clients. For example, account management system 105 is operated to identify client purchase requests and associate a limited use account identifier with a particular client purchase request.

Account management system 105 may also function to forward pre-authorization requests to issuer processors 107. In some embodiments, pre-authorization requests are submitted to issuer processors 107 (or directly to account issuers 160a–n) through the Internet. According to some embodiments, account management system 105 also functions to associate detailed transaction data with settlement data. By allowing detailed transaction data to be associated with settlement data for individual transactions, embodiments of the present invention eliminate the need for merchants to capture customer purchase order information. Further, this allows detailed transaction data to be associated with settlement data even when a supplier does not have the capability to capture enhanced data at the point of sale. These, and other features and advantages of embodiments of the present invention will become apparent to those skilled in the art upon reading this disclosure. In some embodiments, some or all of the functionality of account management system 105 may be provided at one or more of the other devices of system 100 (e.g., some or all of the functionality may be provided at one or more account issuers 106 or the like).

Client terminals 104a–104n may each be any type of computing device, such as a personal computer, a workstation, a network terminal, a network server, a hand-held remote access device, a personal digital assistant (PDA) or any other device or combination of devices that can accomplish two-way electronic communication over the network connection 102.

Account management system 105, issuer processor 107, and account issuer 106 may be one or more servers or other computing devices which operate to perform the functions described herein. In a case where multiple servers act as account issuer 166 or account management system 105, such multiple servers may be independently or jointly operated. Issuer processor 107 may be an entity which acts as a processor on behalf of one or more issuers. For example, issuer processor 107 may be a processor such as Total Systems Services, Inc. of Columbus, Ga.

Merchant servers 108a–n may be one or more computing devices which operate to perform the functions described herein. For example merchant servers 108 may be one or more servers operated by, or on behalf of, merchants to catalog and sell goods or services. In some embodiments, merchant servers 108 may include point of sale or similar payment processing functionality allowing a client to purchase goods or services from a merchant using a payment card.

Each of these terminals and servers may further have various cryptographic software capabilities sufficient to allow secure transmission of financial data therebetween over the network 100. For example, in some embodiments, communications between a client device 104 and account management system 105 are encrypted using a private key of the client. In this manner, the data transmitted is maintained secure. Further, the account management system 105 may utilize a related key to both decrypt the information and to authenticate the identity of the client submitting information to the account management system server.

According to some embodiments, this authentication may be used to accurately identify a client prior to selecting a limited use account identifier for a particular transaction. For example, this authentication may be used to accurately identify a particular master account associated with a particular client. Other specific functions and operations of client terminals 104, account management system 105, account issuer server 106, and merchant servers 108 are discussed further below.

Figure 2A:
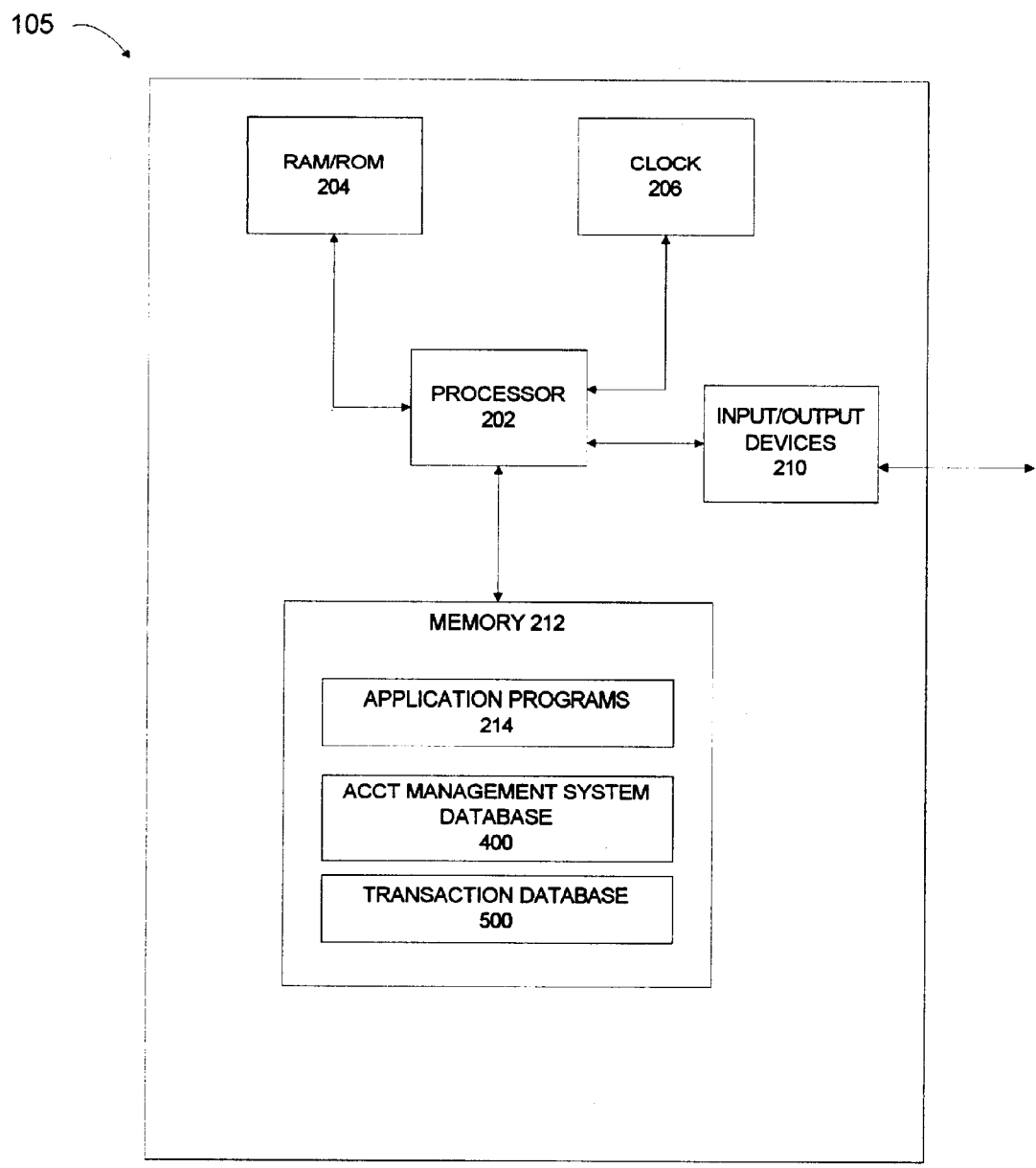
FIG. 2A is a schematic diagram of an exemplary account management system controller for use in the network of FIG. 1.

Turning now to FIG. 2A, displayed therein are exemplary components of account management system 105, the primary component of which is a processor 202, which may be any commonly available CISC or RISC-based processor, such as the PENTIUM 4 microprocessor manufactured by INTEL CORP. The processor 202 may be operatively connected to further known exemplary components, such as random access memory and read only memory (RAM/ROM) 204, a system clock 206, input/output devices 210, and a memory 212 which, in turn, stores one or more computer operating system and application programs 214, a account management system database 400, and a transaction database 500.

The processor 202 operates in conjunction with random access memory and read-only memory in a manner well known in the art. The random-access memory (RAM) portion of RAM/ROM 204 may be a suitable number of Single In-line Memory Module (SIMM) chips having a storage capacity (typically measured in kilobytes or megabytes) sufficient to store and transfer, inter alia, processing instructions utilized by the processor 202 which may be received from the application programs 214. The read-only memory (ROM) portion of RAM/ROM 204 may be any permanent, non-rewritable memory medium capable of storing and transferring, inter alia, processing instructions performed by the processor 202 during a start-up routine of account management system 105.

The clock 206 may be an on-board component of the processor 202 which dictates a clock speed (typically measured in MHz) at which the processor 202 performs and synchronizes, inter alia, communication between the internal components of account management system 105 as well as with external computing devices.

The input/output device(s) 210 may be one or more commonly known devices used for receiving system operator inputs, network data, and the like and transmitting outputs resulting therefrom. Accordingly, exemplary input devices may include a keyboard, a mouse, a voice recognition unit and the like for receiving system operator inputs.

Output devices may include any commonly known devices used to present data to an system operator of account management system 105 or to transmit data over the computer network 100 to, for example, client terminals 104a–n, issuer processor 107, etc. For example, client terminal 104 may be operated to forward purchase order information and information identifying the client to account management system 105. Account management system 105 may be operated to forward pre-authorization request data to issuer processor 107. Account management system 105 may also be operated to forward a selected limited use account identifier to the client terminal 104.

Data may also be transmitted to and from issuer servers over, for example, the Internet. Accordingly, suitable output devices may include a display, a printer and a voice synthesizer connected to a speaker. Other input/output devices 210 may include a telephonic or network connection device, such as a telephone modem, a cable modem, a T-1, T-2 or T-3 connection, a digital subscriber line or a network card, wireless transceiver, or the like for communicating data to and from other computer devices over the computer network 100. In an embodiment involving a network server, it is anticipated that the communications devices used as input/output devices 210 will have capacity to handle high bandwidth traffic via network 100.

The memory 212 may be an internal or external large capacity device for storing computer processing instructions, computer-readable data, and the like. The storage capacity of the memory 212 is typically measured in megabytes or gigabytes. Accordingly, the memory 212 may be one or more of the following: a floppy disk in conjunction with a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of and available devices for memory 212 will be apparent.

In some embodiments, the memory 212 may store, inter alia, a plurality of programs 214 which may be any one or more of an operating system such as WINDOWS XP by MICROSOFT CORP, and one or more application programs, such as a web hosting program and a database management program of the type manufactured by ORACLE, each of which may be used to implement various embodiments of the present invention.

The programs 214 may also include processing instructions for accomplishing communication of data with client terminals 104a–n and issuer servers 106a–n, as described herein. Accordingly, the programs 212 may include communication software for allowing communication with client terminals 104a–n, and the like. The web hosting software may include functionality sufficient to read JAVASCRIPT, hypertext mark-up language (HTML), extensible mark-up language (XML) and other similar programming languages typically used in conjunction with hard-wired or wireless Internet systems, and may further use known cryptographic techniques to accomplish secure communications, such as secure socket layer (SSL) communications.

In some embodiments, the programs 214 may also include a database management program, e.g., such as those manufactured by ORACLE CORP., to save, retrieve and analyze data in a database format that is received by the account management system server 105. The programs 214 may also include other applications, such as VISUAL BASIC, to allow an operator to program specific functionality performed by the account management system server 105, as described herein. The programs 214 thus cooperate to form a system which operates in the manner described below.

In some embodiments, account management system 105 may include other applications programs which are used to assist in the reconciliation of transaction data with settlement data. In some embodiments, account management system 105 (or one or more servers in communication with account management system 105) are configured to receive and match pre-authorization transaction data (including, for example, individual purchase order numbers and associated data) with daily settlement data received from issuer processor 107. For example, this data may be matched using the particular limited use account number associated with a particular purchase order number.

In some embodiments, this matching may be performed at another server in communication with network 100. This matching allows the generation of detailed transaction records which can then be transmitted to the client for record and bookkeeping purposes. The memory 212 may also store a plurality of relational, object-oriented or other databases, such as account management system database 400 which tracks information regarding different purchasing system participants including a number of limited use account identifiers associated with each participant, and the transaction database 500 which stores data relating to transactions performed using the account management system. Particular examples of such databases are described below with respect to FIGS. 4 and 5, respectively. In some embodiments, some or all of this data may be stored at one or more devices operated by or on behalf of financial processing agents that process transactions on behalf of the account issuer.

Figure 2B:
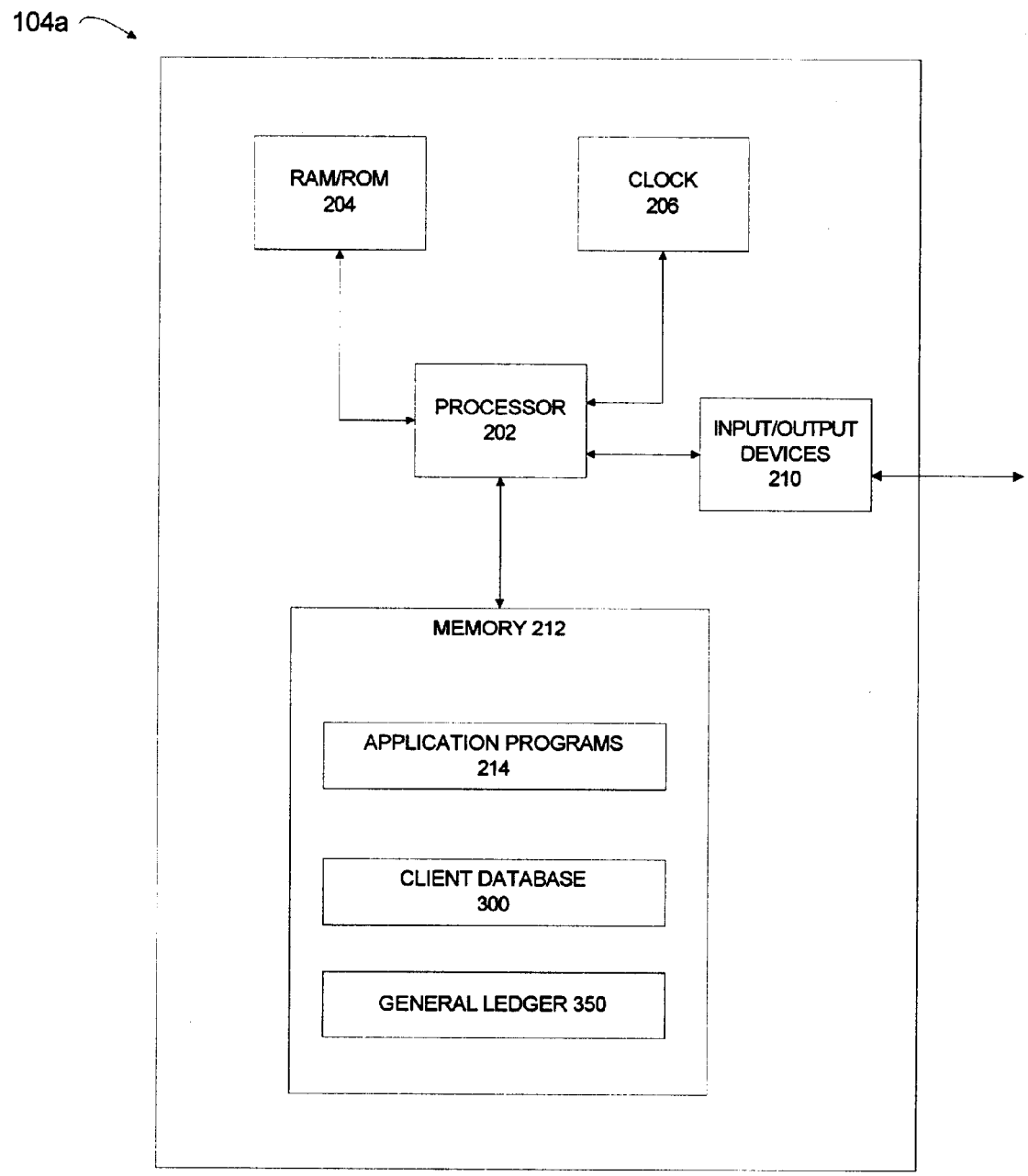
FIG. 2B is a schematic diagram of an exemplary client server for use in the network of FIG. 1.

Turning now to FIG. 2B, exemplary components of a client terminal 104a are depicted, the configuration of which may be similar to the account management system 105 described previously with respect to FIG. 2A. However, it should be readily appreciated that terminal 104a may be any other form of computing device suitable for accomplishing two-way communications with merchant servers 108a–n, account management system 105 and other devices. Client terminal 104a may be a device operated by or on behalf of a client (e.g., a participant in a purchasing program operated pursuant to embodiments of the present invention). Client terminal 104a may be, for example, a procurement system terminal operated by a client. It is anticipated that a typical operator of client terminal 104a may be an employee or agent of a corporation which is a participant in a purchasing program operated pursuant to the present invention.

In the depicted embodiment, the client terminal 104a may store (or otherwise have access to) a client database 300 in memory 212, the purpose of which is described further with respect to FIG. 3 immediately below. The terminal 104a may also store (or otherwise have access to) general ledger information 350 for generating corporate financial information, company accounting reports, and the like. Client terminal 104a may also store (or have access to) one or more applications programs 214 which, when executed, cause client terminal 104a to operate in a predetermined manner. Applications programs 214 may include any of a number of different types of applications, including, for example, accounts payable and/or inventory reconciliation programs which are used by the client to manage purchasing data.

Further, in some embodiments, application programs 214 may include purchasing programs which allow the generation and management of purchasing orders by a client. In some embodiments, the generation of a purchase order may be automated and used to trigger the submission of a message to account management system 105 requesting the allocation and pre-authorization of a limited use account identifier for use in purchasing the goods identified in the purchase order.

Application programs 214 may also include general ledger or accounting programs which track goods and services purchased by the client. Pursuant to some embodiments of the present invention, a client receives detailed transaction information regarding purchases made. This detailed transaction information can be used to reconcile and update the client accounting system. Because the process allows automatic updating and reconciliation using detailed transaction data, client workload and errors are reduced. Tools such as the Purchasing Accounting Reporting Information System (PARIS) provided by GENERAL ELECTRIC CAPITAL CORPORATION (and/or it's affiliates) may be used to generate data files which may be utilized by client general ledger software. The PARIS system may be used, for example, to sort corporate spending into predetermined categories for tax and corporate accounting purposes.

Although the embodiments described herein with respect to FIGS. 2A and 2B involves components of typical existing electronic computing devices, other existing or future technologies which perform similar functions may be readily employed.

Databases 300, 400 and 500 will now be described in conjunction with FIGS. 3–5, respectively. In referring to the databases depicted therein, note that the first row of the databases includes a field header describing each exemplary field of the database. Fields of data are represented by columns while each of the rows correspond to one exemplary record of the respective database. One of ordinary skill in the art will readily appreciate that further or fewer fields and records of data, or other combinations of the same, may be used. The databases 300, 400 and 500 described herein may also be configured into any number of relational databases. In addition, configurations other than database formats may be used to store the data maintained in exemplary databases 300, 400 and 500, such as spreadsheets formats, word processing formats, text-delimited files and the like.

Referring now to FIG. 3, an exemplary client database 300 is maintained by a client to store data that accommodates internal reconciliation of all transactions involving various limited use account identifiers assigned to the client by an account issuer. For example, database 300 may be a database associated with a purchasing tool operated by a company which uses features of embodiments of the present invention to operate a purchasing program. Data shown as stored in database 300 may be generated in several steps. For example, some data may be generated when a client employee or agent initially causes a purchase order to be generated. Other data may be generated after a limited use account identifier is associated with a particular purchase order by account management system 105. Yet other data may be generated from detailed transaction data provided to the client after completion of a transaction. Some or all of this data may be stored in separate databases a single database is shown for the purposes of explanation.

The exemplary database 300 may include a limited use account identifier field 302, a merchant/Item identifier field 304, a purchase order identifier field 306, a transaction amount field 308, a transaction date field 310, an expiration date field 312, and a status of delivery field 314. The database 300 may be used in conjunction with exemplary process 700 by which the client selects and pays for items purchased from a merchant, as described in detail with respect to FIG. 7 below.

Limited use account identifier field 302 may be used to store one or more separate limited use account identifiers associated with the client and used in a transaction occurring within a specified period of time, such as one day, one week or one month. Each limited use account identifier may be a unique alphabetic, numeric, alpha-numeric, binary or other code which may be generated by account management system 105. In some embodiments, a client may receive limited use account identifiers by submitting a request to account management system 105, as described with respect to FIG. 6 below, wherein the request may include further information from other fields of the database 300.

Merchant/item identifier field 304 may be used to store a MID or item identifier, corresponding to a merchant and/or an item involved in a particular transaction. The MID may be an SIC code or other standardized merchant identifier, a name of the merchant, and the like. The item identifier may be a name of the item, a catalog number of the item, an SKU code, and the like. As may be readily appreciated, the item may be a product of manufacture, a service, or a combination of the same available for purchase from a selected merchant.

Purchase order identifier field 306 may be used to store information identifying a particular purchase order associated with a particular transaction and which is associated with the limited use account identifier of field 302. The purchase order identifier may be any alphabetic, numeric, alpha-numeric, binary or other code which is assigned by the client to internally identify and reconcile a particular transaction. In some embodiments, the purchase order identifier will be a purchase order code, the function of which is well known in the accounting arts. However, the identifier in field 306 may be any unique or non-unique identifier or string of characters that the client wishes to use to identify the transaction. The identifier stored in field 306 may be formatted so that it can be entered directly in a general ledger of the client, as described further below.

Transaction amount field 308 may be used to store an amount of the transaction. Likewise, transaction date field 310 may be used to store a date on which the transaction occurred. This information may be provided upon completion of a transaction (e.g., after transaction settlement data has been associated with a particular purchase order and forwarded to the client). Other data fields may also be provided which may further detail information regarding the transaction and which may be used for accounting and reconciliation purposes.

Expiration date field 312 may store an expiration date of the limited use account identifier, as is commonly found with credit accounts and the like. For a particular client, all the limited use account identifiers may have the same expiration date. However, it is readily contemplated that various expiration dates may or may not be separately assigned to each limited use account identifier. Furthermore, the expiration date of a limited use account identifier may be the same as other limited use account identifiers in the pool. For example, each limited use account identifier may be assigned an expiration date on the date that it is issued. For example, the expiration of each limited use account identifier may be set at 2–3 years after issuance. As will be described further below, each pre-authorization associated with a limited use account identifier will also have an expiration date separate from the expiration date of the account identifier. For example, each pre-authorization may be assigned a period of time in which it is valid or in which it may be used to complete the transaction for which it is issued. The status of delivery field 314 may be used to store one or more indications relating to the delivery of the item or items involved in a particular transaction. Accordingly, such indicators may include, for example, (i) an indication that all items were received (ii) an indication that some, but not all, ordered items have been received (e.g., the shipment is a "partial shipment"), or (iii) that none of the items have been received. These indications may be used by a client to reconcile its purchasing transactions using application programs 214 suited to inventory reconciliation or accounts payable. Pursuant to some embodiments of the present invention, partial shipments may be easily tracked. For example, in some purchasing situations, a pre-authorization may be generated for purchase which may involve multiple items, some of which may be shipped separately. Pursuant to some embodiments, a transaction can be completed in multiple steps.

For example, a pre-authorization may be established for a total purchase amount of $500, with an expiration date of Jun. 1, 2002. If the merchant needs to ship the goods in three different batches, the merchant may submit three separate authorization requests to an account issuer. Each authorization request will be compared against pre-authorization data associated with the limited use account identifier. Each authorization request must be submitted before the expiration date associated with the pre-authorization, and the total amount authorized must be less than the pre-authorization amount. In the example, the three separate shipments must total less than $500 and must be authorized prior to Jun. 1, 2002. The result is a purchasing system which provides improved merchant and customer flexibility, while allowing increased transaction approval control. Pursuant to some embodiments of the present invention, this ability to compare several partial shipments or authorizations with a single pre-authorization may be performed in a manner which is transparent to the purchasing client.

FIGS. 4 and 5 describe the databases 400 and 500 that may be maintained at (or otherwise accessible to) account management system 105 to track client information, associated limited use account identifiers, and transactions involving limited use account identifiers.

Turning now to FIG. 4, there is depicted an exemplary account management system database 400 which may be used by an entity operating account management system 105 to track the usage of limited use account identifiers available to each client from an assigned pool of available limited use account identifiers. If a client's purchasing transactions within a selected period of time exceed a threshold amount, then it may become necessary to assign more limited use account identifiers to the pool of a particular client. The data stored in database 400 allow an account issuer to readily determine when a threshold number of limited use account identifiers are unavailable, so that further identifiers may be assigned. Accordingly, the database 400 may include the following exemplary fields: a master account identifier field 402, a number of limited use account identifiers assigned field 404, a number of limited use account identifiers in use field 406, a number of limited use account identifiers with partial shipments field 410, a percentage of limited use account identifiers available field 412, and a next available limited use account identifier field 414.

The master account identifier field 402 may be used to store a client's master account identifier(s). For example, embodiments of the present invention allow different pools of limited use account numbers to be associated with different purchasing entities at a client. For example, a company may have a number of different purchasing divisions, each of which has its own pool of limited use account identifiers. To identify each purchasing group, each group is assigned a different master account identifier. Each master account identifier may be, for example, a numeric, alphanumeric, alphabetic, binary or other code that uniquely identifies each purchasing group of a client. In this manner, different groups can administer, control, manage, and track their own purchasing expenditures.

The limited use account identifiers assigned field 404 indicates the total number of limited use account identifiers that were assigned to the pool corresponding to a particular master account. The number of available limited use account identifiers may be based on the purchasing history of the particular entity associated with the master account, or based on their anticipated future purchasing activity. For example, if it is known that a particular client group averages 40 transactions per month, and accounts are typically settled within one month, at least 40 limited use account identifiers may be associated with the master account identifier for use by that particular client group.

The number of limited use account identifiers in use field 406 may be used to store an indication of the number of assigned limited use account identifiers that are presently in use by the client group identified by the master account number of field 402. Limited use account identifiers that are "in use" may be those that are involved in a transaction that has not yet been fully settled, such as transactions where there has been partial or no delivery of the item(s) ordered from a merchant. As described below with respect to FIG. 8, in some embodiments, account management system 105 as well as the client may be provided with settlement data indicating whether a particular transaction involving a particular limited use account identifier has been completed. This information is used by account management system 105 to, for example, manage the distribution and reuse of limited use account identifiers. This information is also used to track partial shipments of goods. In some embodiments, this can be used in conjunction with information from clients to track the delivery of items.

Information regarding transaction totals that are less than the total pre-authorization amount may indicate a transaction involving "partial shipments" (e.g., where the merchant is shipping goods in more than one batch). For example, data may be provided to track the number of limited use account identifiers which are associated with transactions that appear to involve partial shipments. This information may be tracked in the field labeled number of limited use account identifiers with partial shipments 410. This field may be used to store an indication of the number of limited use account identifiers in which the subject transaction has not been reconciled due to partial shipment of a number of items ordered from merchant. Pursuant to some embodiments, a limited use account identifier may be used to purchase goods even where the goods are shipped in multiple batches or shipments, so long as the total amount is less than or equal to the pre-authorization amount and so long as all transactions associated with the pre-authorization are completed prior to the expiration of the pre-authorization.

The percentage of limited use account identifiers available field 412 may be used to store an indication of a client's current usage of assigned limited use account identifiers. The indication may be calculated, for example, by summing the totals of fields 406–410 and dividing the sum by the number stored in field 404. In some embodiments, when the number of available identifiers falls below a certain threshold, e.g. 10%, account management system 105 may determine that further limited use account identifiers should be made available to the client and can do so without interaction from the client.

The next available limited use account identifier field 414 may be used to store an indication of the next assigned limited use account identifier that may be used by the client in a subsequent transaction. The limited use account identifier may be selected from the pool of limited use account identifiers assigned to a particular client identified by a particular master account in field 402, on for example, a first-in, first-out (FIFO) basis. For example, in one embodiment having a pool of 20 assigned, unused limited use account identifiers, the first listed available identifier will be the identifier assigned to the particular client's next transaction request.

Allocation of a pool of limited use account identifiers to different groups of a client is beneficial when compared to systems in which one-time limited use account identifiers are assigned on a transaction-by-transaction basis. For instance, it is less likely that a limited use account identifier will be incorrectly associated with a client since the pool of available limited use account identifiers has been pre-established for a particular client. In some purchasing systems, individual cards are printed and issued to individuals participating in a purchasing program. This can be costly and error prone, providing a large amount of purchasing discretion and authority to individuals. Applicants have found that embodiments of the present invention provide greater control, fewer errors, and greater transaction details and information.

In managing the pool of limited use account identifiers, it is contemplated that, in some embodiments, no limited use account identifiers may be re-issued until all other limited use account identifiers have been used. For example, limited use account identifiers may be reissued on a first-in-first-out basis where identifiers are made available in the card pool after their pre-authorization has expired or their associated transaction has fully settled.

It is further contemplated that limited use account identifiers may be re-issued in the order in which they were reconciled based on the receipt of settlement data from account issuers or issuer processors. The availability of a limited use account identifier can be readily determined by reference to the transaction database 500 described immediately below.

Turning now to FIG. 5, there is depicted an exemplary transaction database 500 by which the purchasing system may track various transactions involving assigned limited use account identifiers. From this database, account management system 105 may be operated to determine the status of all client transactions, and generate account summaries for each client periodically, as described further below with respect to FIG. 7. The data in transaction database 500 may be generated based on settlement information received from an account issuer or issuer processor. This information may be used in the management of limited use account identifiers and may also be forwarded to client devices for reconciliation with client software.

As an example, the transaction database 500 may include the following exemplary fields: a limited use account identifier field 502, a master account identifier field 504, a preauthorized amount field 506, a payment amount requested field 508, a merchant/item identifier submitted with preauthorization request field 510, a received merchant/item identifier field 512, an authorization field 513 and a reissue limited use account identifier field 514.

The limited use account identifier field 502 may be used to store an indication of a limited use account identifier used by a particular client within a selected period of time. The master account identifier field 504 indicates a particular group or entity associated with the client to which the limited use account identifier corresponds. As described further above, each group of a client may have a number of limited use account identifiers assigned to it for its use. The use and distribution of these limited use account identifiers is managed by account management system 105.

The preauthorized amount field 506 may be used to indicate an acceptable transaction amount or range of transaction amounts that is identified based on a purchase order request submitted by a client. The payment amount requested field 508 may be used to store an indication of the amount of payment requested by a merchant that received the limited use account identifier from the client as payment. In some embodiments, the merchant/item identifier submitted with preauthorization request field 510 may store an indication of an item, a merchant and/or a purchase order number identified by the client in a request for a limited use account identifier. In some embodiments, a general ledger account number is also provided. The received merchant/item identifier field 512 may be used to store an identification of an item or a merchant as received in settlement data from the account issuer or issuer processor.

In some embodiments, if the merchant/item identifier is transmitted to the user and stored in field 510, then the transmitted merchant identifier must match the information stored in field 512 as received from the merchant in order for the transaction to be authorized. In some embodiments, no merchant identifier needs to be transmitted from the merchant to the account issuer or agent thereof in order to perform an authorization of the transaction.

The authorization field 513 may be used to store an indication of whether the subject transaction was authorized for payment by the account issuer or agent thereof. The transaction may be accepted if data submitted by a client for the transaction matches the payment request for the merchant, as described further below with respect to FIG. 7. In some embodiments, the authorization field 513 may store an authorization response received from an account issuer. In other embodiments, the authorization field 513 simply stores an indication of whether a transaction was authorized or declined.

The reissue limited use account identifier field 514 may be used to store an indication of whether the transaction has been settled or otherwise completed. If the transaction has settled, the limited use account identifier used for the transaction may be re-used, or re-issued to the client for use in a subsequent transaction. In some embodiments, a limited use account identifier may be reissued if the preauthorization associated with the limited use account identifier has expired (e.g., if the limited use account identifier was never used for an intended transaction). In this manner, account management system 105 can manage the use and distribution of a finite set of limited use account identifiers associated with each master account.

It is contemplated that the databases described above may include further transaction-specific information in a format that may be useful for categorizing the transactions into specific headings for an client's general ledger. For example, detailed information on the items being purchased may be included so as to readily categorize the transaction or portions of the transaction into an appropriate tax category and the like. Other examples of enhanced transaction information include the agent or employee that authorized or initiated the transaction as well as any other transaction-related information that will assist the client in reconciling and expensing the transaction.

Exemplary processes for the present invention will now be described in conjunction with the foregoing descriptions of suitable apparatuses and data structures that may be used to implement the present invention.

Figure 6:
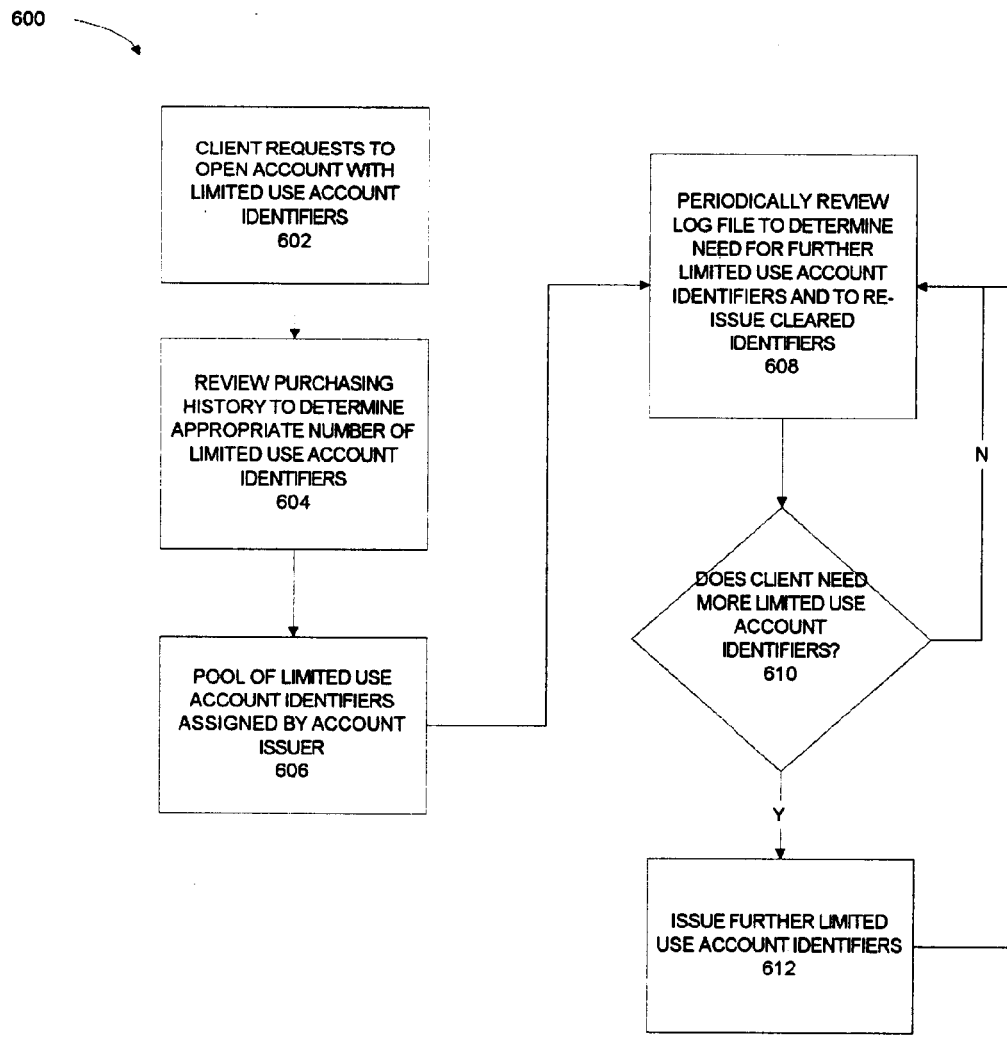
FIG. 6 is a flowchart depicting an exemplary process for assigning limited use account identifiers to a financial account of a client and authorizing transactions using the same.

Turning now to FIG. 6, therein is depicted an exemplary process 600 performed by account management system 105 or the like for assigning a pool of limited use account identifiers to a client. In this example, the process 600 may be performed when a company initially registers to participate in a purchasing program pursuant to embodiments of the present invention. The process 600 commences when a client requests to open a master account having access to a pool of limited use account identifiers for use with individual transactions (step 602).

In some embodiments, in order to determine an appropriate number of limited use account identifiers to assign to the pool, an account issuer, issuer processor and/or account management system 105 may analyze a transaction history of the client (step 604). From the transaction history, the issuer may determine the client's average number of purchase transactions within a particular time period, such as day, month or year. The issuer may also determine the highest peak number of transactions within such time period. The number of limited use account identifiers to be assigned may then be set to exceed the determined peak and/or average usage. In other embodiments, the number of limited use transaction identifiers may be assigned based on an expected or projected transaction volume.

Processing continues at 606 where a pool of individual limited use account identifiers is assigned to or associated with the client's master account. The limited use account identifiers selected, in some embodiments, may each be a unique code. In certain embodiments, the first few digits of the limited use account identifier may serve as a BIN or the like for identifying the account issuer. During this assigning step, the account issuer may confirm that each limited use account identifier is not assigned to another client.

In one currently preferred embodiment, the limited use account identifiers are each formatted as payment card numbers, allowing them to be processed and routed using existing payment networks. Any or all of the master account numbers and the limited use account numbers may be formatted pursuant to card association or financial institution rules. For example, the account numbers may be a sixteen-digit number (as used by MasterCard) or a fifteen-digit number (as used by American Express). For example, the first five to seven digits may be reserved for processing purposes and identify the issuing bank and card type. The last digit may be used as a check sum, while the intermediary digits are used to uniquely identify a particular account. Those skilled in the art will recognize that other conventions and formats may also be used.

Returning to process 600, account management system 105 (e.g., operating in conjunction with an issuer or issuer processor) may be operated to periodically review data files received from the client to determine the need for further limited use account identifiers and to reissue cleared identifiers (step 608). This step may be performed by setting a threshold number or percentage of used identifiers for an client. By referencing, for example, field 412 of account management system database 400, a determination may be made whether the percentage of used cards exceeds the established threshold.

If the client has a need for more limited use account identifiers (step 610), the process 600 continues to step 612 below. Otherwise the process returns to step 608 above.

At step 612, further limited use account identifiers may be associated with a master account if a threshold usage of limited use account identifiers has been exceeded. In such case, the list of available limited use account identifiers will be updated for the client. Field 404 of account management system database 400 may then be updated to reflect the new number of limited use account identifiers available. From step 612, the process 600 returns to step 608 above, such that usage of limited use account identifiers by the client may be monitored and limited use account identifiers may be added as necessary.

Figure 7:
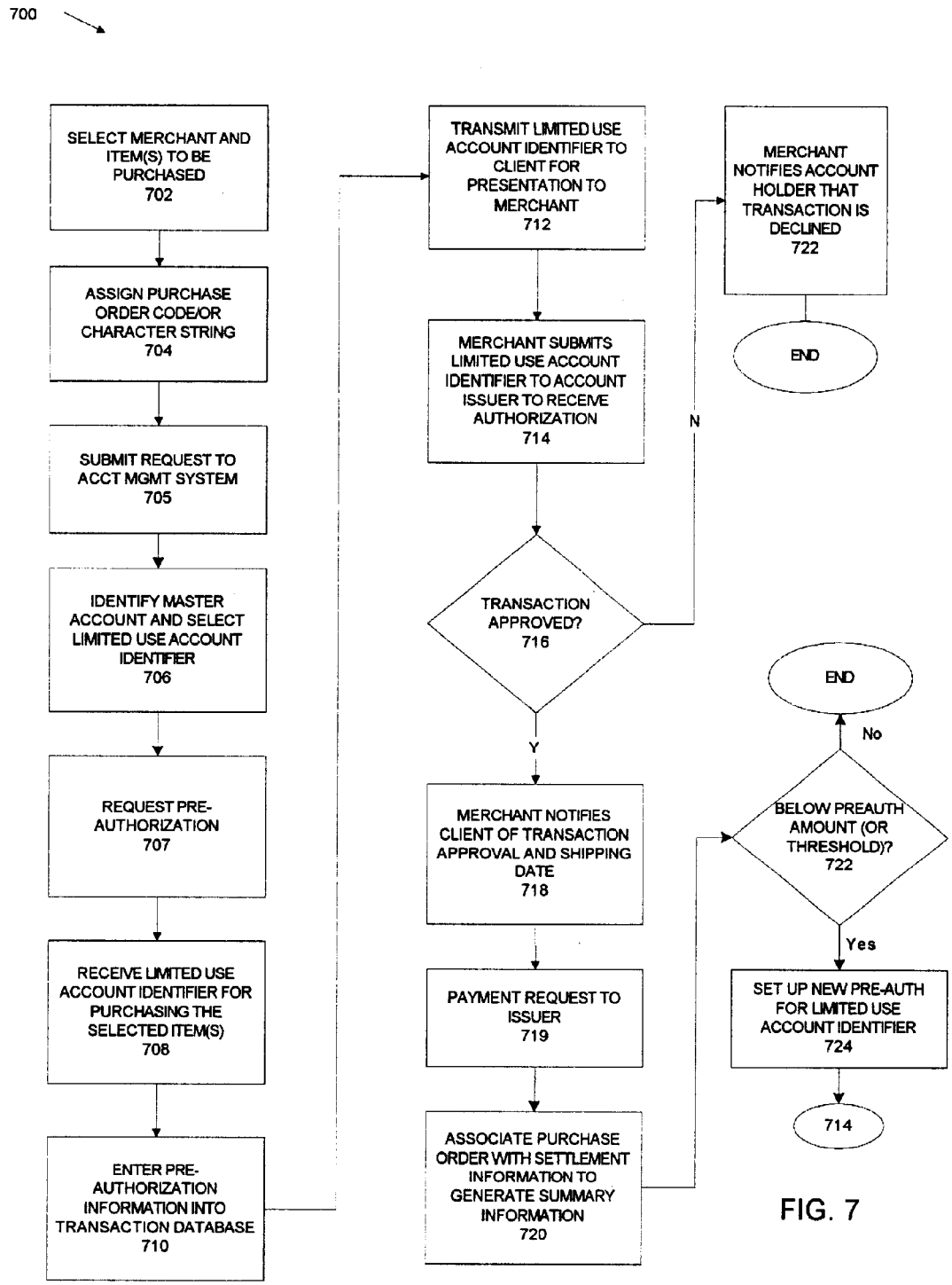
FIG. 7 is a flowchart depicting an exemplary process for purchasing an item.

Turning now to FIG. 7, a process 700 for conducting a purchasing transaction pursuant to some embodiments of the present invention is described. To assist in explanation of features of embodiments of the present invention, an example transaction will be discussed in conjunction with the process of FIG. 7. In the example transaction, an authorized employee of a company (the "client") is attempting to purchase a number of new file cabinets from an office supply company (the "merchant").

The process begins at step 702 when a participant in a purchasing program (a "client" or its agent) selects a merchant and one or more items to be purchased from the merchant. In the example transaction, the employee selects the file cabinets to purchase (e.g., from a catalog, over the Internet, etc.) from the office supply company. This selection may be performed using purchasing system software of the client.

The client (or the purchasing system software or accounting software used by the client) then assigns a purchase order identifier to the desired transaction (step 704). In the example transaction, the purchase order identifier is automatically generated (e.g., from the company's procurement system). Processing continues at 705 where the client (e.g., by operating an client device such as shown in FIG. 1) submits the purchase order information to account management system 105. The purchase order information submitted at 705 may include detailed transaction information about the intended purchase and also includes a total proposed purchase price for the transaction. In some embodiments, the generation of the purchase order identifier automatically triggers the submission of a message to account management system 105. In some embodiments, the message sent to account management system 105 is an XML formatted message.

Processing continues at 706 where account management system 105 operates to authenticate the identity of the client submitting the request. In some embodiments, processing at 706 may include verifying a digital signature or other cryptographic identity of the client (e.g., the message sent at 705 may be digitally signed or encrypted using a private key of the client). Once the identity of the client is ascertained, account management system 105 selects a limited use account identifier from the pool of limited use account identifiers associated with that particular client (e.g., by accessing one or more account management system databases such as the database of FIG. 4). In the example transaction, the purchasing system authenticates the identity of the corporation and selects an available limited use account identifier associated with the master account of the corporation.

Processing continues at 707 where a pre-authorization request is submitted from account management system 105 to the issuer processor (or, in some embodiments, to the account issuer). This pre-authorization request may be submitted, for example, over an open network such as the Internet or over other networks.

Various methods for pre-authorizing a transaction are disclosed in U.S. Pat. Nos. 5,991,750 and 6,226,624 entitled "System and Method for Pre-Authorization of Individual Account Transactions" and "System and Method for Pre-Authorization of Individual Account Remote Transactions" issued on Nov. 23, 1999 and May 1, 2001, respectively, and assigned to the assignee of the present invention, the entirety of each of which is incorporated herein by reference. In accordance therewith, the pre-authorization request may be handled by electronic communication between issuer processor 107 and account management system 105 over computer network 100. Such requests may be handled in any other known and suitable manner. The pre-authorization request includes the limited use account identifier selected at 706 and information from the purchase order (e.g., such as the total purchase amount of the proposed transaction).

In some embodiments, the pre-authorization request may further include any of the following: (i) an identification of the merchant, such as by name, location SIC code, standard MID code and the like and (ii) an identification of an item or items to be purchased, such as by SKU number or catalog number. In some embodiments, an additional amount may be added to the expected purchase amount of the proposed transaction to account for additional transaction costs. For example, in some embodiments, an additional amount may be added representing expected sales tax, shipping costs, or the like. In some embodiments, a currency conversion may be performed to convert from the currency of the client to the currency of the issuer (or vice versa) and/or to the currency of the merchant (or vice versa).

In response to the pre-authorization request, the issuer processor returns a pre-authorization response to account management system 105. If the pre-authorization response is a confirmation that a pre-authorization for a particular amount has been set up, processing continues at 708 where account management system 105 forwards the selected limited use account identifier to the client. The client may then utilize the limited use account identifier in the subject transaction. Information from the pre-authorized transaction request may be stored in the appropriate fields 502, 504, 506 and 510 of the transaction database 500 as appropriate (step 710).

After receipt of the assigned limited use account identifier from account management system 105, the client may transmit the received limited use account identifier to the merchant to effect payment for the ordered item (step 712). In the example transaction introduced above, the employee may utilize the limited use account identifier to purchase the office equipment from the office equipment supplier (e.g., by presenting the limited use account identifier over the telephone, via fax, over the Internet, or the like). In some embodiments, the limited use account identifier is presented along with information identifying an expiration date of the limited use account identifier.

The merchant, in turn, transmits an authorization request to the account issuer or payment agent thereof to receive payment (step 714). Information transmitted in the authorization request includes, for example, the limited use account identifier received from the client, the expiration date of the identifier, a financial amount of the transaction and (in some embodiments) an identification of the merchant.

It is contemplated that the present invention may be performed over existing payment networks without the merchants having to make operative changes to their current practices of receiving payments therefrom. Accordingly, it is not necessary for the merchant to transmit any further information. However, in certain embodiments, it is contemplated that the network may be modified so that the merchant may also transmit further information such as an item identifier, a purchase order identifier received from the client, an expiration date of the limited use account identifier and other data pertaining to the transaction.

In some embodiments, upon receipt of the payment request, the account issuer compares the data received from the merchant in the payment request to the data submitted by account management system 105 in the pre-authorization request (step 716). If the data, such as transaction amount and merchant, match then the transaction may be approved, after which the process 700 continues to step 718 below. If the data does not match, then the transaction may not be approved and the process continues to step 722 where the merchant informs the client that the transaction was not approved. In this case, the pre-authorization record may remain valid or in force until an authorization request is submitted which complies with the pre-authorization criteria or until the pre-authorization expires. In some embodiments, the pre-authorization may remain in force until one or more authorizations are submitted which comply with the pre-authorization criteria or until the pre-authorization expires.

When the transaction is approved, the process 700 continues from step 716 to step 718 where the merchant may notify the client of transaction approval and, for example, the shipping date for the ordered item(s). Settlement information from the account issuer is subsequently forwarded to the account management system server and is, for example, used to update database fields such as fields 508 and 512 of the transaction database 500.

A payment request message is transmitted at 719 from the merchant (or a merchant acquirer or other agent of the merchant) to issuer processor 107 or issuer 106 requesting payment for the transaction. This payment request message may be a batch message transmitted on a regular basis (e.g., nightly) as is known in the art.

Processing continues at 720 where an account summary is generated that details the approved transaction. In some embodiments, this account summary includes data from settlement records returned from the account issuer or issuer processor as well as data from pre-authorization records associated with the transaction. For example, in some embodiments, account management system 105 (or some other device) is operated to combine data from settlement records with data from pre-authorization records. This information, according to one embodiment, is matched up based on the limited use account number associated with the transaction. This allows the production of information which includes transaction level data matched with settlement data. In particular, this "enhanced" transaction data is provided without requiring merchants to capture enhanced data at the point of transaction. Many existing point-of-sale devices used by merchants (and many payment networks) do not currently allow the capture of enhanced data at the point of sale. Embodiments of the present invention provide an efficient, accurate, and detailed technique for providing enhanced transaction data to clients.

In some embodiments, processing continues at 722 where a determination is made whether the settlement amount requested by the merchant is less than the pre-authorization amount (e.g., the amount pre-authorized at step 707). In some embodiments, the determination at 722 includes comparing the settlement amount to the pre-authorization amount minus a threshold amount (which may be pre-established by the issuer or by the client). For example, if the pre-authorized amount was for $1,000 and the merchant's settlement request is for $500, processing at 722 will determine that the settlement request is below the pre-authorized amount and processing will continue to 724 where account management system 105 may set up another pre-authorization for the limited use account identifier to allow the merchant to complete shipment or sale of the pre-authorized goods. For example, in the hypothetical example, the additional pre-authorization request may be for $500.

In some embodiments, the additional pre-authorization request is set up for the same merchant. In some embodiments, the original pre-authorization expiration date may be maintained. In this manner, embodiments of the present invention permit the control and monitoring of transactions which may involve multiple shipments or settlement requests by a merchant (e.g., where the merchant ships an order in phases). This process may repeat until all of the pre-authorized amount is utilized (or some pre-determined threshold percentage of the total is met) or the expiration date occurs.

If processing at 722 indicates that the settlement amount requested by the merchant is not less than the pre-authorized amount (or is not less than the pre-authorized amount less a threshold amount), processing ends and the limited use account identifier is made available for future transactions in the card pool. During the time in which a limited use account identifier is associated with an open pre-authorization, that limited use account identifier may not be used for any transactions other than those contemplated by the pre-authorization. In this manner, embodiments of the present invention permit great control over the use of account numbers, thereby reducing the potential for employee or user fraud or mistakes. Further, this detailed transaction-level control also reduces the potential for fraud or mistakes by merchants or by unscrupulous third parties. Further still, this transaction-level control reduces or eliminates manual processing and reconciliation which may otherwise be required to match transactions to purchasing data in client systems.

The account summary is generated for use by the client in process 800, described below with respect to FIG. 8. The process 700 then ends. In the example introduced above, after the employee places her order with the office supply company, the office supply company submits a payment message to an issuer requesting approval of the transaction using the limited use account identifier. If the transaction is approved, the settlement record indicating the approval is associated with the purchase order information originally provided by the employee. This information is then passed back to the company for its use. In this manner, embodiments of the present invention provide detailed transaction data to clients, including information from the purchase order as well as settlement information. This detailed transaction information may be used to update the company's general ledger or other transaction systems.

Figure 8:
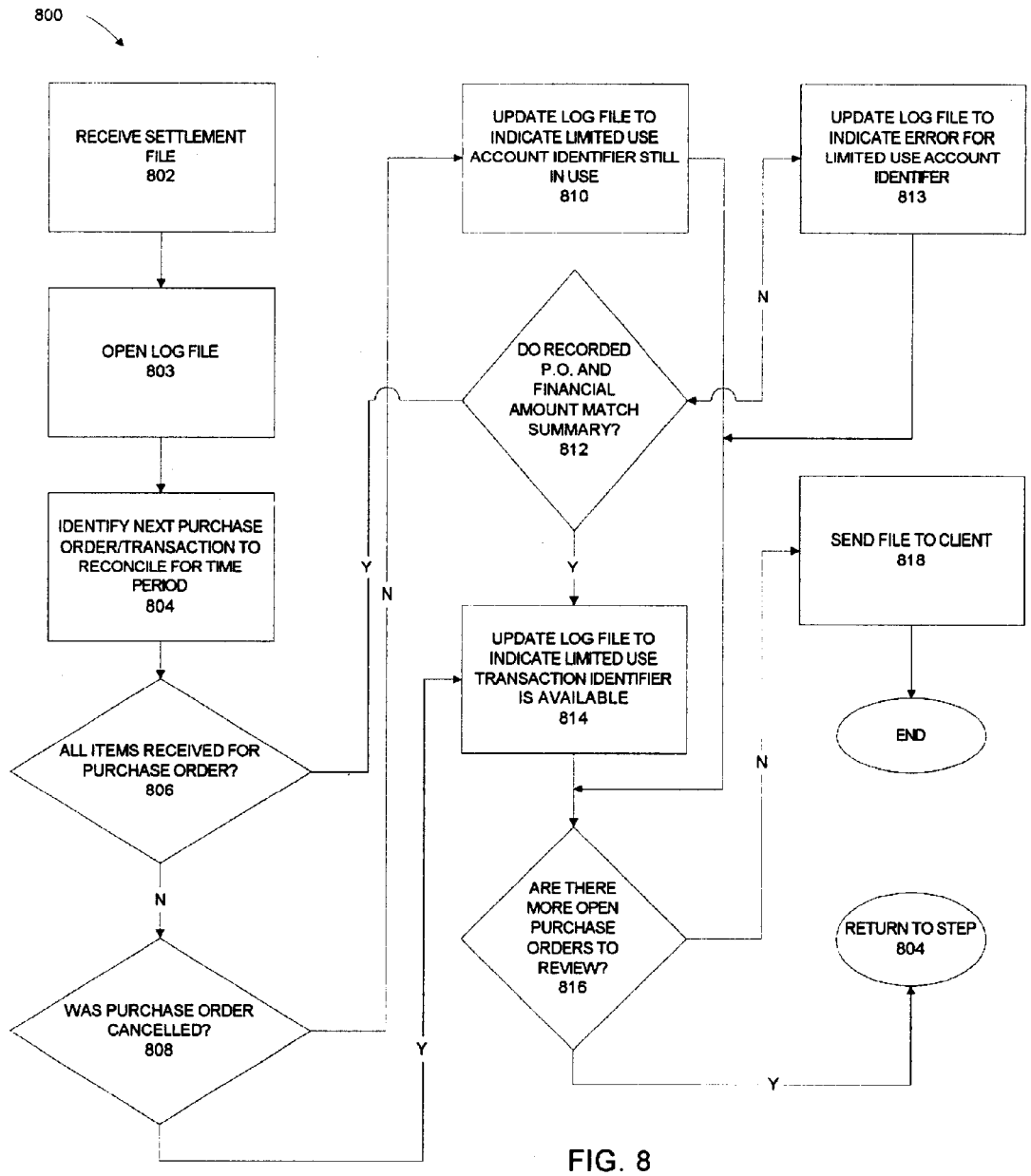
FIG. 8 is a flowchart depicting an exemplary process for reporting and reconciling transactions between a client and a account management system, according to certain embodiments of the present invention.

FIG. 8 depicts an exemplary reconciliation process 800 performed by account management system 105 to process transactions which were conducted using features of embodiments of the present invention. In some embodiments, the process 800 begins when a nightly settlement file is received from issuer processor (or, in some embodiments, from an account issuer) (step 802). The settlement file may be provided on a daily, weekly, monthly, quarterly or other basis. The settlement file may also be provided in a written format or may be transmitted electronically to account management system 105 over network 100.

Account management system 105, upon receipt of this settlement file, may reconcile data associated with various purchase orders (step 803). The settlement file may be formatted as an XML file or it may be provided in other formats, such as (but not limited to): standard database, word processing, spreadsheet, accounting software, and delimited text files.

In some embodiments, account management system 105 utilizes the summary data to individually reconcile purchase transactions completed since the last settlement (step 804). The settlement file includes a list of different limited use account identifiers which were used in completed transactions during the settlement period.

These limited use account numbers are matched with the purchase order numbers to which they were assigned, allowing account management system 105 to generate detailed transaction data about each completed transaction.

In some embodiments, account management system 105 generates an account summary including both the settlement information associated with a particular limited use account identifier and the detailed transaction data associated with the purchase order identifier submitted with the pre-authorization request and stored in field 510. The matching of this data allows the generation of account summary information which can be provided to the client and which provides clients with detailed transaction data for each completed transaction.

Account management system 105 next operates to determine whether all items subject to the first purchase order identifier have been received from the merchant (step 806). If so, the process 800 continues to step 812 below. Otherwise, the process 800 continues to step 808 where account management system 105 determines whether the transaction was cancelled by the client. If the transaction was cancelled, the process 800 continues to step 812 below. Otherwise, the process 800 continues to step 810 where data is written to the log file that indicates that the limited use account identifier is still in use. Account management system 105 may be operated to place an indication in field 514 of database 500 that the limited use account identifier corresponding to the purchase order identifier is not to be re-issued yet. From step 810, the process 800 continues to step 816 discussed further below.

Continuing from step 806, if all items for the purchase order have been received, the process 800 continues to step 812 where account management system 105 is operated to determine whether the purchase order identifier and transaction amount match from internal records match the data listed in the account summary, thereby performing a reconciliation of the transaction. If the records match, the process continues to step 814 below. Otherwise, the process 800 continues to step 813 where account management system 105 is operated to place an indication of an error in the log file for the transaction. The error may be noted in field 514 of database 500 by account management system 105, such that the limited use account identifier is not re-issued until the error is rectified. After step 813, the process 800 continues to step 816 below.

From step 812, if the compared data match, the process continues to step 814 where account management system 105 is operated to updated the log file to indicate that the limited use account identifier is cleared and may be re-issued.

The process 800 then continues to step 816 where account management system 105 is operated to determine whether there are more transactions to review for the account summary. If so, the process 800 returns to step 804 above for the next selected transaction. If not, the process 800 continues to step 818 where the account summary associated with a particular client is transmitted to the client, such as by electronic transmission over network 100, after which the process 800 end.

FIG. 9 depicts an exemplary account summary 900 as may be transmitted by account management system 105 to a client, in accordance with the process 700 described with regard to FIG. 7 above. The account summary 900 may be printed and mailed to the client periodically, or may contain the displayed information in an electronic data file that may be generated periodically and transmitted electronically over the network 100 to the client. In various embodiments, the account summary 900 is in an electronic format that is compatible with the client's reconciliation or accounts payable programs.

The account summary 900 may contain a list of the transactions entered into by the client in a predetermined time period, such as a day, a week, or a month. Accordingly, the account summary may list the date of the transaction, the limited use account identifier used, the purchase order number associated with the transaction and received from the client's pre-authorization request, the amount of the transaction and the merchant and/or item(s) involved in the transaction.

A further example of the operation of the present system will now be described. An authorized employee of a corporate purchasing department selects a plurality of office supplies to purchase from an office supply vendor. The employee receives an assigned purchase order from the company's purchasing system. The employee then requests a limited use account identifier from account management system 105 over a network connection. This request may be performed automatically without any need for intervention by the employee (e.g., the company's purchasing system may be configured to automatically transmit a request to account management system 105 once a purchase order has been assigned).

The request transmitted to account management system 105 includes the purchase order number and a transaction amount for the transaction, e.g. $55. In some embodiments, further enhanced data may be provided, such as an accounting category useful for entering the purchasing transaction into the company's corporate ledger, e.g. "tax-related business expense—office supplies." Item information, merchant information or other enhanced data may also be included in the request.

Account management system 105 identifies the master account associated with the company (e.g., using a cryptographic authentication or other process to identify the company) and selects an available limited use account identifier. The limited use account identifier is submitted for pre-authorization along with information about the expected amount of the transaction. The issuer processor, in turn, receives the pre-authorization request and responds with pre-authorization information. Account management system 105 then returns the selected (and pre-authorized) limited use account identifier to the client. In some embodiments, the request and response between account management system 105 and issuer processor 107 is performed over an open network such as the Internet, allowing features of embodiments of the present invention to be utilized without need for a connection to financial payment networks. In some embodiments, this information is transmitted in a secure manner to reduce the potential for loss.

Upon receipt of the limited use account identifier, the client initiates the purchasing transaction by providing the limited use account identifier to the vendor. The vendor determines an amount for the transaction, including a purchasing price for the ordered items, tax, shipping charges, and the like equal to $53.75. The merchant then submits a payment request to the account issuer or authorized agent thereof for that amount. The request may include, for example, the amount of the transaction and the limited use account identifier as supplied by the client. However, in advanced payment processing systems, further information such as item categories may be provided in the payment request.

The issuer processor then confirms that the purchase amount and/or merchant conforms to the information submitted by the client in the pre-authorization request and approves the transaction request. Settlement data is transmitted to account management system 105 which then associates the settlement data with the purchase order data to produce an account summary which is transmitted to the company for its records. The account summary includes detailed transaction data as originally submitted by the client and also includes final payment information as submitted by the account issuer. The format of the summary may accommodate importation of the data directly into the company's general ledger.

Features of embodiments of the present invention have been described indicating that limited use account identifiers are provided to a client prior to receiving goods from a merchant. In some embodiments, however, features of embodiments of the present invention may be used to remit payment for goods after the goods have been received by the client. For example, in some transactions, a client may receive goods for inspection. After inspection (if the goods meet the client's approval), the client may initiate a purchase transaction pursuant to embodiments of the present invention (e.g., generate a purchase order, request a limited use account identifier, and submit the limited use account identifier to the merchant for payment).

In some embodiments, reversals or credits may also be tracked using features of the present invention. For example, if a merchant credits an account (e.g., for a returned item or the like), account management system 105 may operate to search for transactions associated with the limited use account identifier, the settled amount and/or with the merchant which are equivalent or near the amount of the credit. Once the original transaction is identified, the credit amount is associated with the original purchase order number and settlement details are provided to the client. In this manner, the client's accounting and/or purchasing systems can track purchases as well as returns or credits.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method of providing a limited use account identifier to a client, the method comprising:
    establishing a master account for a client;
    assigning a pool of limited use account identifiers that correspond to the master account prior to a purchase by the client, said pool of limited use account identifiers including a plurality of limited use account identifiers each identifying a separate financial account at an issuer, each formatted for processing by payment card networks, and each issued without an associated physical transaction card, each of the pool of limited use account identifiers being different from the master account identifier;
    receiving, from the client, a request for a purchase of an item from a merchant;
    identifying the pool of limited use account identifiers associated with said client; and
    assigning one of said plurality of limited use account identifiers from said pool for use by said client in making said purchase with said merchant.

2. The method of claim 1, wherein said request comprises:
    an identification of a financial amount for the purchase, and a purchase order identifier assigned by the client for the purchase.

3. The method of claim 2, said purchase order identifier may be used to identify information in at least one of: a general ledger of the client; a client database; a account management system database.

4. The method of claim 2, said request further comprising an identification of the merchant.

5. The method of claim 4, said identification of the merchant comprising a standard industrial code (SIC) corresponding to the merchant.

6. The method of claim 1, further comprising:
    establishing a pre-authorization for the purchase, said pre-authorization including an amount and a period of validity.

7. The method of claim 6, further comprising:

receiving, from the merchant, the limited use account identifier and an amount of the purchase; and authorizing completion of the transaction using the limited use account identifier if said purchase amount is within the pre-authorized amount.

8. The method of claim 7, further comprising:

providing an account summary of the master account to the client, the account summary including the financial amount and the purchase order number, whereby the client may enter data from the account summary into a general ledger.

9. An apparatus for providing a limited use account identifier to a client, comprising:

a processor; and a memory in operative communication with the processor, the memory for storing a plurality of processing instructions enabling the processor to:

establish a master account for an client, the master account having a master account identifier;

assign a pool of limited use account identifiers that correspond to the master account prior to a purchase by the client, said pool of limited use account identifiers including a plurality of limited use account identifiers each identifying a separate financial account at an issuer, each formatted for processing by payment card networks, each of the pool of limited use account identifiers being different from the master account;

receive, from the client, a request for a purchase of an item from a merchant;

identify the pool of limited use account identifiers associated with said client;

assign one of said plurality of limited use account identifiers from said pool for use by said client in making said purchase with said merchant; and provide said one of said plurality of limited use account identifiers to said client without issuing a physical transaction card.

10. A computer readable medium encoded with processing instructions for implementing a method, performed by a computer, for providing a limited use account identifier to a client, the method comprising:

establishing a master account for a client, the master account having a master account identifier;

assigning a pool of limited use account identifiers that correspond to the master account prior to a purchase by the client, said pool of limited use account identifiers including a plurality of limited use account identifiers each identifying a separate financial account at an issuer and each formatted for processing by payment card networks, each of the pool of limited use account identifiers being different from the master account identifier, receiving, from the client, a request for a purchase of an item from a merchant;

identifying the pool of limited use account identifiers associated with said client;

assigning one of said plurality of limited use account identifiers from said pool for use by said client in making said purchase with said merchant; and providing said one of said plurality of limited use account identifiers to said client without issuing a physical transaction card having said account identifier embossed thereon.

11. A method of conducting a transaction involving a client and a merchant, comprising:

identifying an item to purchase from said merchant;

associating information identifying the item to purchase with a purchase order identifier;

submitting the purchase order identifier to an account management system; and receiving, in response to said submitting, a limited use account identifier allocated by said account management system for use in said transaction, said limited use account identifier associated with a pre-authorization record having at least a first authorization criteria, said limited use account identifier identifying a financial account at an issuer.

12. The method of claim 11, further comprising:

presenting said limited use account identifier to the merchant for payment; and receiving an indication of an authorization for the transaction if the transaction complies with the at least first authorization criteria in the pre-authorization record.

13. The method of claim 11, said pre-authorization record having at least a second authorization criteria, said receiving an indication of an authorization if the transaction complies with both said at least first and said at least second authorization criteria.

14. The method of claim 11, further comprising:

receiving, after completion of the transaction, an account summary including information identifying details of the transaction.

15. The method of claim 11, wherein the associated information comprises at least one of: the purchase order identifier; an amount; an identification of the merchant; and detailed transaction information from the purchase order.

16. The method of claim 15 wherein said details further include general ledger information corresponding to an appropriate entry for the item in a general ledger of the client.

17. The method of claim 11, wherein said limited use account identifier is made available for a subsequent transaction upon at least one of: settlement of said transaction and expiration of said pre-authorization.

18. An apparatus for conducting a transaction involving a client and a merchant, comprising:

a processor; and a memory in operative communication with the processor, the memory for storing a plurality of processing instructions enabling the processor to:

identify an item to purchase from said merchant;

associate information identifying the item to purchase with a purchase order identifier;

submit the purchase order identifier to a account management system; and receive, after submitting the purchase order identifier, a limited use account identifier allocated by said account management system for use in the transaction, said limited use account identifier associated with a pre-authorization record having at least a first authorization criteria, said limited use account identifier identifying a financial account at an issuer.

19. A computer-readable medium encoded with processing instructions for implementing a method, performed by a computer, for conducting a transaction involving a client and a merchant, the method comprising:

identifying an item to purchase from said merchant;

associating information identifying the item to purchase with a purchase order identifier;

submitting the purchase order identifier to a account management system; and receiving, after said submitting, a limited use account identifier allocated by said account management system for use in said transaction, said limited use account identifier associated with a pre-authorization record having at least a first authorization criteria, said limited use account identifier identifying a financial account at an issuer.

20. A method for performing an electronic transaction, comprising:

receiving a plurality of limited use account identifiers corresponding to a master account, each of said limited use account identifiers identifying a financial account at an issuer;

receiving information identifying a desired transaction, said information including a purchase order identifier and an identification of a buyer and an amount;

associating one of said limited use account identifiers with said desired transaction;

establishing a pre-authorization record for said desired transaction, said pre-authorization record including at least one transaction limitation associated with said limited use account identifier;

forwarding said limited use account identifier to said buyer for use in conducting said transaction; and receiving, after completion of said transaction, settlement information associated with said limited use account identifier and associating said settlement information with said purchase order identifier.

21. The method of claim 20, wherein said information identifying said desired transaction further includes information identifying an expected price of said item.

22. The method of claim 21, further comprising:
forwarding said settlement information to said buyer.

23. The method of claim 21, further comprising:
forwarding said settlement information to said buyer in a form which can be imported into a general ledger.

24. The method of claim 21, wherein said item comprises a plurality of items.

25. The method of claim 21, wherein said detailed transaction information further includes identification of a merchant.

26. The method of claim 20, wherein said identification of said buyer is confirmed using cryptographic techniques.

27. A method for initiating a purchasing transaction, comprising:

selecting a merchant and an item to purchase from the merchant;

associating a purchase order with the selected item;

providing information associated with the purchase order to an account management system for association with the purchase of the item;

receiving, from the account management system, a limited use account identifier corresponding to a master account, said limited use account identifier selected by said account management system for use in completing said purchase from said merchant, the limited use account identifier selected from a plurality of available, pre-assigned limited use account identifiers, each of said limited use account identifiers identifying a separate account at an account issuer; and providing the selected limited use account identifier to the merchant in order to initiate payment for the item.

28. The method of claim 27, said item comprising at least one of: a product and a service.

29. The method of claim 27, said limited use account identifier comprising one of: a numerical code, an alphabetic code and an alpha-numeric code.

30. The method of claim 27, said master account having a single master account identification code that is different from each of the plurality of available limited use account identifiers by at least one character.

31. The method of claim 27, wherein said plurality of limited use account identifiers each comprise sixteen characters.

32. The method of claim 27, further comprising:

receiving settlement data confirming the completion of a transaction involving said limited use account identifier, said settlement data including a transaction date and a transaction amount; and associating said settlement data with said purchase order to generate an account summary.

33. The method of claim 32, further comprising:
generating data indicating that said limited use account number is available for reuse.

34. The method of claim 32, further comprising:
updating a general ledger based on said account summary.

35. The method of claim 27, wherein said associating includes matching said settlement data with said purchase order based on said limited use account identifier.

36. The method of claim 27, said providing the information associated with the purchase order to the account management system further comprising:

providing information identifying a master account and information identifying said financial amount to said account management system.

37. The method of claim 27, said selected limited use account identifier comprising a re-activated limited use account identifier that was used in a prior transaction.

38. The method of claim 37, wherein the re-activated limited use account identifier is selected after a predetermined time from the prior transaction.

39. The method of claim 37, wherein the re-activated limited use account identifier is selected when said limited use account identifier is next in a listing of re-activated limited use account identifiers.

40. The method of claim 37, wherein the re-activated limited use account identifier is selected after settlement of a prior transaction involving the re-activated limited use identifier.

41. The method of claim 27, wherein said plurality of limited use account identifiers are assigned to the master account prior to said ordering.

42. The method of claim 27, further comprising:
receiving from the account management system an authorization to use the limited use account identifier, prior to said providing the selected limited use account identifier to the merchant.

43. The method of claim 27, wherein a total number of said plurality of limited use account identifiers is determined by at least one of the account management system and an account issuer.

44. The method of claim 43, wherein the total number is determined based on at least one of: a purchasing history of the client and an anticipated purchasing volume of the client.

45. The method of claim 27, wherein the item comprises a plurality of items.

46. A method for purchasing an item, comprising:
associating a plurality of limited use account identifiers with a master account associated with a client, each of said limited use account identifiers identifying separate financial accounts at an issuer;

receiving information identifying a proposed transaction, said information including information identifying an item to purchase, an amount of the proposed transaction, and a purchase order identifier;

selecting one of said plurality of limited use account identifiers for use in purchasing said item, said selection based on an identity of the client and an availability of one of said plurality of limited use account identifiers;

submitting a pre-authorization request to one of an issuer or an issuer processor;

receiving a pre-authorization for said proposed transaction, said pre-authorization associated with an expiration date and a transaction amount limit; and forwarding said selected limited use account identifier to said client for use in purchasing said item.

47. The method of claim 46, wherein said information identifying a proposed transaction includes information identifying a merchant and a date.

48. The method of claim 46, further comprising:

receiving settlement information from one of said issuer or said issuer processor, said settlement information including at least a transaction date and a transaction settlement amount;

determining that the proposed transaction was completed as a partial shipment; and submitting a further pre-authorization request to one of said issuer or said issuer processor, said further pre-authorization for an amount approximately equal to the difference between said transaction amount limit and at least one of said transaction settlement amount and an authorized amount.

49. A method for issuing a pre-authorized limited use account identifier for purchase of an item by a buyer, comprising:

receiving, from a buyer, a purchase order code to identify a purchase of an item;

selecting a limited use account identifier for payment for the item, the limited use account identifier selected from a plurality of pre-assigned limited use account identifiers corresponding to a single master account of the buyer, the limited use identifier selected based on an identity of the buyer and an availability of one of said plurality of limited use account identifiers;

transmitting the limited use account identifier and a financial amount for the item to an account issuer, without the purchase order code, in order to establish a pre-authorization for the purchase; and providing the limited use account identifier to the buyer for use in purchasing the item;

wherein at least one of said selecting transmitting and providing is performed using a computer.

50. A method for entering and reconciling a purchase transaction, comprising:

establishing a master account having a master account identifier with a account management system;

establishing a plurality of limited use account identifiers corresponding to the master account, each of the limited use account identifiers being different from the master account identifier;

selecting a merchant and an item to purchase from the merchant;

generating a purchase order identifying said item and a purchase amount;

forwarding information associated with said purchase order and information identifying said master account to said account management system;

receiving a pre-authorized limited use account identifier;

submitting said pre-authorized limited use account identifier to said merchant to purchase said item;

receiving an account summary, said account summary including information from said purchase order and information confirming said purchase;

wherein at least one of the steps of the method are performed using a computer.

* * * * *